US009731484B2

(12) United States Patent
Rohrer et al.

(10) Patent No.: US 9,731,484 B2
(45) Date of Patent: Aug. 15, 2017

(54) METHOD AND DEVICE FOR MAKING TUBULAR BAGS OF THIN PLASTIC FILMS BY MEANS OF AN ULTRASOUND WELDING PROCESS

(71) Applicant: Pantec AG, Stansstad (CH)

(72) Inventors: Hans-Peter Rohrer, Moehlin (CH); Carsten Lautz, Orselina (CH); Hans Peter, Herznach (CH)

(73) Assignee: PANTEC AG, Stansstad (CH)

( * ) Notice: Subject to any disclaimer, the term of this patent is extended or adjusted under 35 U.S.C. 154(b) by 169 days.

(21) Appl. No.: 14/377,591

(22) PCT Filed: Jan. 14, 2013

(86) PCT No.: PCT/EP2013/050536
§ 371 (c)(1),
(2) Date: Aug. 8, 2014

(87) PCT Pub. No.: WO2013/117383
PCT Pub. Date: Aug. 15, 2013

(65) Prior Publication Data
US 2015/0000821 A1    Jan. 1, 2015

(30) Foreign Application Priority Data
Feb. 10, 2012   (DE) ........................ 10 2012 202 016

(51) Int. Cl.
| B32B 37/00 | (2006.01) |
| B32B 38/00 | (2006.01) |
| B65B 51/00 | (2006.01) |
| B29C 65/00 | (2006.01) |
| B29C 65/08 | (2006.01) |
| B29C 65/74 | (2006.01) |
| B65B 51/22 | (2006.01) |
| B65B 51/30 | (2006.01) |
| B32B 37/10 | (2006.01) |
| B29L 31/00 | (2006.01) |
| B65B 25/04 | (2006.01) |
| B65B 9/20 | (2012.01) |

(52) U.S. Cl.
CPC .......... *B32B 37/0046* (2013.01); *B29C 65/08* (2013.01); *B29C 65/743* (2013.01); *B29C 65/7443* (2013.01); *B29C 66/1122* (2013.01); *B29C 66/4312* (2013.01); *B29C 66/8161* (2013.01); *B29C 66/81427* (2013.01); *B29C 66/8322* (2013.01); *B29C 66/8491* (2013.01); *B29C 66/92615* (2013.01); *B29C 66/92655* (2013.01); *B32B 37/1045* (2013.01); *B32B 38/0004* (2013.01); *B65B 51/225* (2013.01); *B65B 51/303* (2013.01); *B29C 65/7416* (2013.01); *B29C 66/4322* (2013.01); *B29C 66/71* (2013.01); *B29C 66/72321* (2013.01); *B29C 66/73921* (2013.01); *B29C 66/81422* (2013.01); *B29C 66/81423* (2013.01); *B29C 66/81463* (2013.01); *B29C 66/9516* (2013.01); *B29L 2031/7128* (2013.01); *B32B 2310/028* (2013.01); *B32B 2439/46* (2013.01); *B32B 2439/70* (2013.01); *B65B 9/20* (2013.01); *B65B 25/04* (2013.01); *Y10T 156/12* (2015.01)

(58) Field of Classification Search
CPC ................ B32B 37/00; B32B 37/0046; B32B 37/1045; B32B 38/00; B32B 38/0004; B65B 51/00; B65B 51/225; B65B 51/303; B29C 65/00; B29C 65/08; B29C 65/743; B29C 65/7443; B29C 66/00; B29C 66/1122; B29C 66/4312; B29C 66/81427; B29C 66/8161; B29C 66/83221; B29C 66/8491; B29C 66/92615; B29C 66/92655
See application file for complete search history.

(56) References Cited

U.S. PATENT DOCUMENTS

| 3,816,216 A | 6/1974 | Takei | |
| 6,379,483 B1 | 4/2002 | Eriksson | |
| 6,482,291 B1 * | 11/2002 | Kume | B29C 65/08 156/553 |
| 2007/0062158 A1 | 3/2007 | Boldrini | |
| 2012/0111475 A1 * | 5/2012 | Ippers | B29C 65/087 156/73.1 |
| 2013/0133499 A1 | 5/2013 | Rohrer | |

FOREIGN PATENT DOCUMENTS

| DE | 601 01 954 T2 | 12/2004 |
| DE | 103 56 431 A1 | 6/2005 |

(Continued)

OTHER PUBLICATIONS

International Search Report issued by the European Patent Office in International Application PCT/EP2013/050536.

*Primary Examiner* — Michael N Orlando
*Assistant Examiner* — Matthew Hoover
(74) *Attorney, Agent, or Firm* — Henry M. Feiereisen LLC

(57) ABSTRACT

A method and a device are disclosed for making thin plastic films having two or more layers, which are subdivided and separated in the form of tubular bags for portioned reception of different products, wherein the plastic films are provided with welding seams running substantially transversely to the longitudinal direction with predetermined spacing between one another to form bag-like containers, and the containers are separated from one another by a cutting or separating process, the method being characterized by the steps: a) welding the films with predetermined spacing by means of an ultrasound welding process, maintaining a defined, film-dependent distance between a processing tool and a counter tool while welding; and b) separating the tubular bags welded in this way by means of a mechanical cutting process, with or without reduced ultrasound excitation at the point of the respective weld seams.

5 Claims, 3 Drawing Sheets

(56) References Cited

FOREIGN PATENT DOCUMENTS

| | | |
|---|---|---|
| DE | 10 2006 009 890 | 9/2007 |
| DE | 60 2005 806 T2 | 5/2009 |
| DE | 10 2009 002 296 | 10/2010 |
| EP | 1 127 794 | 8/2001 |
| EP | 1 241 100 A1 | 9/2002 |
| GB | 2 248 796 | 4/1992 |
| WO | WO 02/102664 | 12/2002 |
| WO | WO 2006/041377 | 4/2006 |

* cited by examiner

METHOD AND DEVICE FOR MAKING TUBULAR BAGS OF THIN PLASTIC FILMS BY MEANS OF AN ULTRASOUND WELDING PROCESS

CROSS-REFERENCES TO RELATED APPLICATIONS

This application is the U.S. National Stage of International Application No. PCT/EP2013/050536, filed Jan. 14, 2013, which designated the United States and has been published as International Publication No. WO 2013/117383 A1 and which claims the priority of German Patent Application, Serial No. 10 2012 202 016.0, filed Feb. 10, 2012, pursuant to 35 U.S.C. 119(a)-(d).

The invention relates to a method and a device for making thin plastic films which are divided into portions and separated, in particular in the form of tubular bags for receiving various products, for example in the food industry.

For the production and filling of so-called tubular bag packaging, one or multiple layers of plastic films are welded to each other at predefined distances continuous and transverse to the feed direction and are severed at the thus generated welding line in order to separate the individual tubular bags from each other. In particular in the food industry relatively thin plastic films are used for this purpose, which are for example made from PP, PET or composite plastics and which are continuously welded over the entire width of the tubular bag packaging.

For generating relatively long welding seams in such tubular bags, thermal welding methods are currently used in the state of the art which locally weld the plastic films to each other by generating heat. However, the method of thermal welding poses the risk that product remnants become trapped between the welding seams (see FIG. 4). In particular in the case of lightweight and thus difficult to pour products, such as salad leaves or the like, which are usually packaged vertically, some product remnants may remain in the region of the welding seam, which leads to leakage of the tubular bag and consequently to undesired waste in the production process. In order to prevent this circumstance the production speeds are kept relatively slow in current thermal tubular bag packaging machines of this type to provide sufficient time for the products to fall into the regions in which no welding seam is formed and thus no separation occurs. In the state of the art, the production speed is therefore clearly limited. In addition as a result of a displacement of the welding seam and the separation line, a type of pocket may form on the outside in which product remnants may also become attached when using these thermal tubular bag packaging machines. This leads to an unsanitary appearance of the packaged products and is therefore to be avoided as much as possible to keep the waste as low as possible.

SUMMARY OF THE INVENTION

In light of the foregoing, the invention is based on the object to provide a method and a device for making thin plastic films in the form of a type of tubular bag for the portioned reception of products, in which a higher process speed is possible and waste due to leaky welding seams or product remnants adhering to or remaining in the region of welding lines is avoided.

This object is solved with a method including the steps of welding the plastic films by ultrasound welding at predetermined distances along a longitudinal direction of the plastic films, so as to generate welding seams extending substantially transverse to the longitudinal direction of the thin plastic films, thereby dividing the plastic films in the form of tubular bags for a portioned reception of various products, wherein a defined plastic film dependent gap is maintained between a processing tool and a counter tool; and mechanically separating the welded tubular bags without or with decreased ultrasound excitation at a site of the respective welding seams and with a device including a processing tool; a counter tool; one or multiple ultrasound generators for ultrasound excitation of the processing tool; a drive for moving said processing tool and said counter tool toward each other; a guide; and means for separating welded tubular bags, wherein the processing tool and the counter tool are configured for ultrasound welding of the plastic films at predetermined distances along a longitudinal direction of the plastic films, so as to generate welding seams extending substantially transverse to the longitudinal direction of the thin plastic films, to thereby divide the plastic films in the form of tubular bags for a portioned reception of various products, and for an substantially purely mechanical separation of the welded tubular bags without or with decreased ultrasound excitation. Advantageous refinements of the invention are the subject matter of the dependent claims.

According to the present invention, a method for making two-layered or multi-layered thin plastic films which are divided and separated from each other in the form of tubular bags for a portioned reception of various types of products is proposed, wherein the plastic films are provided with welding seams which extend transverse to the longitudinal direction at predetermined distances for forming bag-like containers, and the containers are separated from each other in a cutting or separating process.

The method according to the invention is characterized by the following steps:
a) welding the films at predetermined distances by means of an ultrasound welding method, wherein a defined film-dependent distance is maintained between a processing tool and a counter tool during the transverse welding;
b) separating the thus welded tubular bags by means of a mechanical separation method without or with a decreased ultrasound excitation at the site of the respective welding seam or welding line.

With the invention a type of two-step method for the production of tubular bags is thus proposed. In a first step a welding seam is produced at the respective welding line by using an ultrasound welding method, wherein the processing tool and has multiple engravings the corresponding counter tool is held at a predetermined film-dependent distance to each other. In a second step which follows within the same movement, the tubular bags are then respectively separated, i.e., detached from each other at the separation lines in the region of the welding seams, wherein hereby the ultrasound excitation is purposely turned off.

The separation in the second step b) therefore occurs with an essentially mechanical separation method without ultrasound excitation. In this way tightly closed welding seams can be formed at a relatively high process speed without the risk that product remnants become trapped in the respective welding seams. In contrast to the thermal welding, in the ultrasound welding method a relatively exact welding seam is generated also in the case of very thin film materials and products that are difficult to pour.

In an alternative device and an alternative method, the amplitude is decreased after the welding process to a degree that the cutting process can be performed without risk. The amplitude is thus not reduced completely to zero, i.e., the ultrasound generator is not turned off, but rather reduced to a value of 10% to 30%.

The welding seams produced in this way are thus non-critical regarding entrapment of product remnants in the region of the welding independent of the type of products. The subsequent purely mechanical separation of the tubular bags can in particular be easily performed also in the case of very thin plastic films whose thickness is for example in the range of 30 µm and at a length of the welding seams of about 5 cm to multiple 10 cm, which are demanded in present thin tubular bags of this type. The tightness of the welding is ensured with high reliability and at the same time a good separation of the individual product-filled tubular bags is enabled. The predefined minimal working gap between the processing tool and the counter tool additionally ensures that the processing tool or the counter tool is/are not damaged during the ultrasound welding. Because the tubular bags are subsequently separated with a mechanical method without or with reduced ultrasound excitation of the tool parts, the counter tool and the processing tool can then be moved closer to each other so that the separation of the individual tubular bags is effected by means of the cutting forces in the region of the welding lines.

In contrast to the thermal welding, the welding by means of ultrasound results in a type of embrittling on the welding line, which enables a relatively easy subsequent mechanical separation of the tubular bags. The separation is safely ensured also over a long region of for example several 10 cm, which corresponds to the usual width of some tubular bags of this type.

According to an advantageous embodiment of the invention, the processing tool is moved closer to the counter tool after step a). Because in step b) an ultrasound excitation is absent for separating the welded tubular bags, the two tool parts can then be moved closer to each other without the risk of damage or destruction than in the case of ultrasound welding. For this reason the welded and filled tubular bags can be detached and separated into individual tubular bags relatively easily with one and the same processing tool and counter tool.

According to a further advantageous embodiment of the invention, in the separation of the tubular bags in step b) the processing tool and the counter tool are brought in direct contact with each other. Hereby either the processing tool or the counter tool can be moved with a corresponding guide and a drive. As an alternative both may also be moved toward each other. The separation of the tubular bags at the separation line, which lies in the region of the welding seam, is in this case effected by the direct contact of the two tool parts and with this by a penetration into the material of the plastic films. For this purpose, one of the tool parts is preferably configured with a type of dull blade or the like so that the penetration into the material of the plastic films results in a secure separation along the entire separation line.

According to a further advantageous embodiment of the invention, the switching on and switching off of the ultrasound excitation of the processing tool is controlled in dependence on a control of a machine drive such as the servo curve of the drive of the packaging machine. The method according to the invention can hereby easily be integrated into existing packaging machines and the switching on and off of the ultrasound excitation of the tool parts occurs directly corresponding to the respective processing step of the packaging machine.

According to a further advantageous embodiment of the invention, the processing tool and the counter tool are continuously moved toward each other at each treatment of the a tubular bag during which the following sub-steps are performed:

i) moving the counter tool during the ultrasound excitation of the processing tool until contact with spring-loaded distance blocks and performing the welding;
ii) turning off the ultrasound excitation of the processing tool during the springing in of the distance blocks, wherein an essentially constant parallel distance between the parts of the tool is maintained;
iii) overcoming the spring force of the spring-loaded distance blocks and moving the two parts of the tool further together for performing the separation at the separation line; and
iv) moving back the two parts of the tool.

With this quasi four-step process a secure welding of the filled tubular bags can be ensured and an exact result regarding the separation of the individual tubular bags is also achieved. With this described four-step method a reliable constant distance during the ultrasound welding is ensured between the tool parts with a relatively simple construction of the device. The spring force of the distance blocks is herby set so that it can subsequently be further overcome by the drive of the device and the separation at a separation line in the region of the welding can also occur directly with the same tool parts, i.e., the processing tool and the counter tool.

According to an alternative embodiment of the invention, no spring-loaded distance blocks are provided but the processing tool and the counter too are held at a defined distance to each other during the ultrasound welding by a special control. The counter tool can thereby be coupled with the machine superstructure via springs. The processing tool is moved toward the counter tool until a predetermined film-dependent distance or gap between the counter tool and the processing tool is established. The ultrasound excitation is in this case already turned on prior to moving the processing tool in the direction toward the counter tool, so that the processing tool moves against the films to be welded under ultrasound excitation. After the ultrasound excitation is turned off the separation process is initiated by moving the processing tool and the counter tool further toward each other or by pressing them against each other with a higher pressing force. As a result of this last step the mechanical separation process is then performed which can be easily carried out due to the prior embrittling at the site of the welding seam by the ultrasound welding. In this alternative embodiment thus no special spring-loaded distance bocks are required for the method according to the invention.

The invention also relates to a device for making thin plastic films according to the features of claim 7, which are divided in the form of tubular bags for the portioned reception of products and are separated, wherein an ultrasound generator for excitation of a processing tool and a counter tool are provided which can be moved toward each other by means of a drive, and with means for separating welded tubular bags, wherein the device is characterized in that the processing tool and the counter tool are specially configured for an ultrasound welding as well as for an essentially purely mechanical separation process without or with reduced ultrasound excitation. In this way a tight and precise welding seam can be generated at relatively thin plastic films and independent of the type of the products over a length of multiple 10 cm and subsequent thereto—after turning off the ultrasound excitation—a mechanical separation of the thus formed tubular bags can be performed. The processing tool and the counter tool are shaped so that an optimal welding by means of ultrasound is possible. For this the processing tool can have the shape of a sonotrode, which is slightly tapered toward the end surface, while the counter tool preferably has an edge. By moving the two tool parts together so as to enter the material of the plastic films, the welded tubular bags can thus be separated comparatively easily and residue-free.

According to an advantageous embodiment of the device according to the invention, a drive and/or a guide are configured with distance elements, which ensure maintaining a defined working gap of at least 0.05 mm during the ultrasound welding. According to an advantageous aspect of the invention, the distance elements can for example be formed as spring-loaded distance blocks on the guide elements. The distance blocks are spring-loaded so that when contacting the distance blocks the defined minimal working gap is maintained also in the case of ultrasound excitation of the processing tool. As soon as the ultrasound excitation is turned off the two tool parts can be moved further toward each other and can for example also be directly brought into contact with each other so that the embrittled welding line can be cleanly mechanically separated. As an alternative other distance elements can also be provided for maintaining the minimal working gap.'

Instead with the described distance elements, which are for example provided in the form of spring-loaded distance blocks, the device according to the invention can also be configured without such distance elements or distance blocks: in this case a special control is implemented so that the processing tool and the counter tool are moved toward each other up to a predetermined distance to each other, which serves for the welding by means of ultrasound and depends on the type and thickness of the films to be welded. The configuration of the device without special distance elements has the advantage that the design and construction is simplified and requires fewer special components.

According to a further advantageous embodiment of the invention, the counter tool is provided with a plane end surface and the processing tool has an approximately triangular shape in the manner of a blade. The blade can in particular be formed at an angle of about 164°, which has proven very useful for the separation of thin plastic films that have been connected with ultrasound welding.

BRIEF DESCRIPTION OF THE DRAWING

Further advantages, features and aspects of the present invention will become more apparent in connection with the following detailed description of an exemplary embodiment, wherein the description occurs in connection with the included drawings, in which.

DETAILED DESCRIPTION OF PREFERRED EMBODIMENTS

Figure 1:
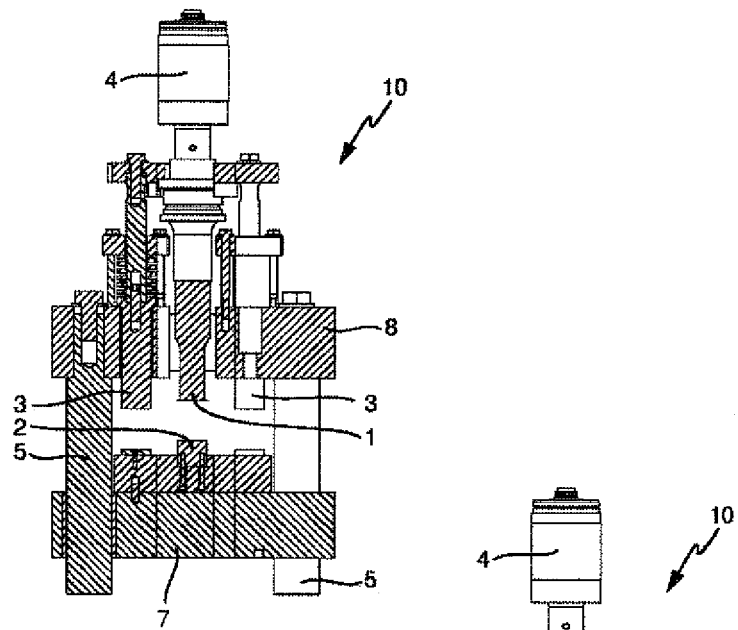
FIG. 1 is a sectional view of an exemplary embodiment of a device according to the invention in the opened state.
Figure 2:
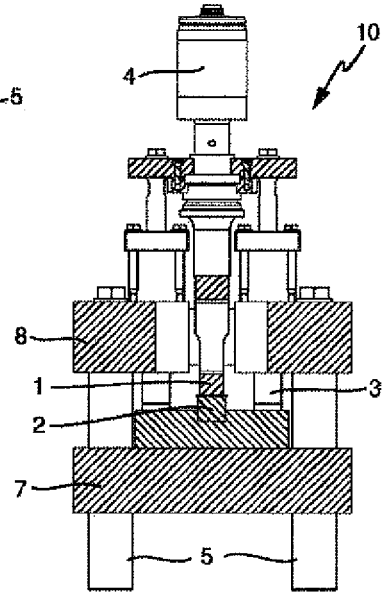
FIG. 2 is a corresponding sectional view of the first exemplary embodiment of the device according to the invention in a closed state of the processing tool.
Figure 3:
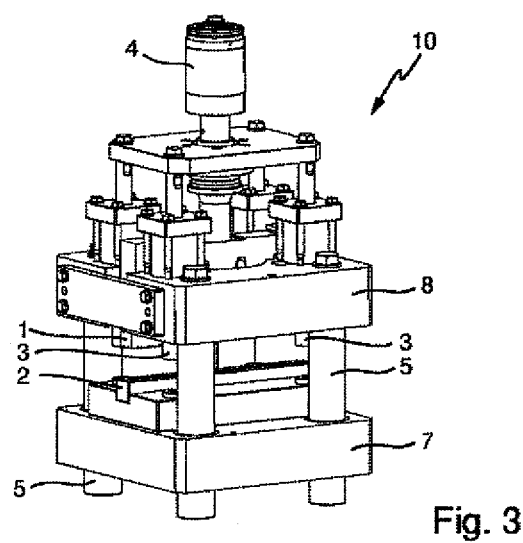
FIG. 3 is a perspective view of the exemplary embodiment of a device according to the invention with open processing tool.

FIGS. 1 to 3 show in different views of an exemplary embodiment of a device for making thin plastic films, which are divided in the form of tubular bags for the portioned reception of products and are separated. FIG. 1 shows a sectional view in which the processing tool 1 on the device 10 is in an open upper position. FIG. 3 shows a corresponding perspective view also in an open position of the processing tool 1, whereas FIG. 2 shows a sectional view of the state in which the processing tool 1 and the counter tool 2 are moved toward each other for welding by means of ultrasound and/or for performing the separation process of the thus produced tubular bags.

This exemplary embodiment represents a vertically acting device wherein depending of the application the method according to the invention and the device according to the invention can also be constructed as a horizontal system. The device 10 is essentially formed by a base plate 7, at the topside of which the counter tool 2 is detachably mounted so that the counter tool 2 can be exchanged if needed. On the topside of the base plate 7 a mounting plate 8 is provided which is vertically movably coupled with the base plate via four guides 5 in order to be able to move the processing tool 1 which is provided on the topside toward and away from the counter tool 2 (see FIG. 1 and FIG. 2).

The device 10 is specially adjusted for ultrasound welding of thin plastic films as well as for separating tubular bags produced by the ultrasound welding, as will be explained in more detail below. On the topside of the mounting plate 8 an ultrasound generator 4 is mounted which is connected with the processing tool 1, thus enabling ultrasound excitation of the processing tool. Multiple ultrasound generators 4 can also be mounted on the mounting plate 8. The processing tool 1 is mounted together with the ultrasound generator 4 on the mounting plate 8 via four spring-loaded distance blocks 3. For performing a welding and a separation of thus welded tubular bags, the mounting plate 8 is moved downwards by means of guides 5 toward the base plate 7 and with this toward the counter tool 2 until the spring-loaded distance blocks 3 come into contact with corresponding counterparts on the bottom side (side of the base plate 7). The spring-loaded distance blocks 3 ensure that a minimal predefined working gap remains between the processing tool 1 and the counter tool 2 for as long as the processing tool 1 is excited by means of ultrasound. According to an advantageous aspect of the invention, the minimal working gap is at least 0.05 mm. In this way also very thin plastic films, for example in the range of 30 μm can be welded by ultrasound with the device. In the case thicker plastic films are to be welded with the device 10, the working gap can be selected correspondingly greater.

After the welding by means of ultrasound the device 10 is controlled so that the processing tool 1 is moved further in the direction toward the counter tool 2 by overcoming the spring force of the spring-loaded distance blocks 3. This further movement of the two tool parts 1, 2 toward each other results in the separation of the produced tubular bags. Because the ultrasound welding causes a certain embrittlement at the welding line of the plastic films 6, a continuous separation of thus produced tubular bags with the contained products can be performed.

The separation or detachment of the individual welded tubular bags can occur directly at the welding line.

After the separation the processing tool, and with this the ultrasound generator 4, are moved upwards again so that the plastic film or the plastic film tube located between the two tool parts 1, 2 is moved forward corresponding to the size of the tubular bag packaging and the process is repeated anew, i.e., with the first step of an ultrasound welding and the second subsequent step of a purely mechanical separation.

FIG. 3 shows that the processing tool 1 and the counter tool 2 have a longitudinal web-like shape so as to also allow processing of relatively wide tubular bags made of thin plastic films, preferably up to the size of several 10 cm. In this exemplary embodiment a control of the device 10 is provided in such a manner that the ultrasound excitation of the processing tool 1 by means of the ultrasound generator 4 occurs in dependence on a control of a drive (not shown in the drawing). For example the switching on and switching off of the ultrasound can be controlled in a targeted manner by way of the servo curve of a drive of the device 10, so that the ultrasound excitation only occurs when the welding is performed and the processing tool is held at a predefined distance to the counter tool in a targeted manner. This avoids damage to the two tool parts namely the processing tool 1 and the counter tool 2. In this way the method according to the invention can also be easily integrated in existing devices with only minor reconstructions.

The performance of the method according to the invention can be realized with the described device 10 or a differently constructed packaging machine, and preferably occurs in a four step process during a continuous moving toward each other of the two tool parts, wherein the following sub steps are carried out:
i) moving the counter tool 2 during the ultrasound excitation of the processing tool 1 until contact with the spring-loaded distance blocks 3 and performing the welding (alternatively the processing tool 1 can of course also be moved or respectively both tool parts 1, 2);
ii) turning off the ultrasound excitation of the processing tool 1 during the springing in of the spring-loaded distance blocks 3, wherein essentially a constant parallel distance between the parts of the tool is maintained;
iii) monitoring the spring force of the spring-loaded distance blocks 3 and further moving together of the two parts 1, 2 of the tool for performing the separation of the tubular bags on a defined separation line; and
iv) moving the two parts 1, 2 of the tool back and preferably renewed activation of the ultrasound excitation of the processing tool 1.

With this two-step method with the four described sub-steps very good results regarding the tightness of the produced tubular bags as well as the hygiene and the decrease of the waste were obtained by the inventors even in the case of very thin plastic films. The welding seam produced with the ultrasound method is stable also in case of possible product remnants in the region of the welding line. The separation line can be placed directly flush on the welding seam without the occurrence of undesired pockets in which product remnants may accumulate. With the method according to the invention and the device 10 according to the invention significantly higher cycle frequencies could be achieved during the production process of such products with filled tubular bags. Hereby the efficiency of the packaging process could be significantly increased. Furthermore, the method according to the invention and the device 10 according to the invention can be integrated relatively easily into existing packaging systems. In this way the corresponding device parts for performing the method according to the invention can be retroactively installed.

Figure 4:
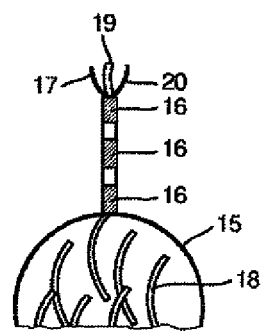
FIG. 4 is a schematic side view of a tubular bag packaging produced with the state of the art.

The schematic side view of FIG. 4 illustrates a problem of tubular bag packagings, which are realized with a conventional technique: this longitudinal section shows a tubular bag 15 which was filled with a product 18 and was subsequently closed with three welding seams 16. After the separation, a type of pocket 20 in which remnants 19 of the product 18 remain, forms between the uppermost welding seam 16 and the separation line 17. This problem is effectively avoided in the present invention.

Figure 5:
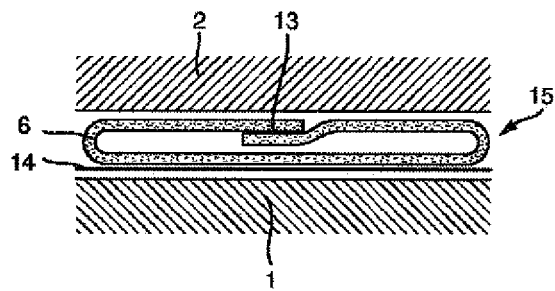
FIG. 5 is a schematic cross sectional view through a tubular bag with overlapping zone between processing tool and counter tool according to an exemplary embodiment of the invention.

FIG. 5 shows a schematic cross sectional view of a tubular bag 15 with overlapping zone of the plastic film 6 between the processing tool 1 and the counter tool 2 according to an exemplary embodiment of the invention. The plastic film, which is overlappingly folded on the top side, is formed by the device according to the invention into a closed tubular bag 15 by welding the film 6 by means of the processing tool 1 and the counter tool 2, namely with an ultrasound welding method. Subsequently the tools 1, 2 are moved further toward each other and the tubular bags 15 are mechanically separated by means of a blade 12 with cutting edge 14. In this exemplary embodiment, the blade 12 is arranged on the lower processing tool. However the opposite arrangement of the tools 1, 2 is also possible. They can also be movable horizontally instead of vertically.

Figure 6A:
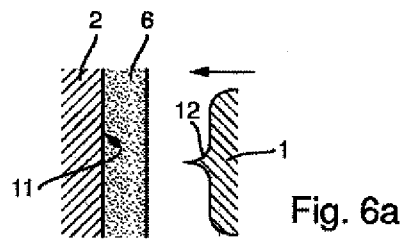
FIGS. 6a to 6c show different stages of the processing of tubular bag packagings according to an exemplary embodiment of the invention.
Figure 6B:
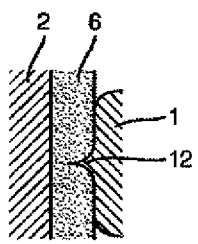
Figure 6C:
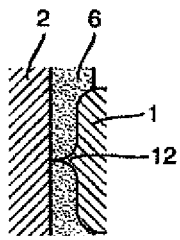

FIGS. 6a to 6c show schematic sectional views of different stages of the processing of tubular bag packagings according to an exemplary embodiment of the invention. In this exemplary embodiment, the plastic films 6, which are processed into a tubular bag which is filled with a product, are inserted vertically between a counter tool 2 and a processing tool 1. The processing tool 1—or alternatively the counter tool 1—is moved toward the films (left direction in FIG. 6a) until contacting the spring-loaded distance blocks (not shown). This stage can be seen in FIG. 6b. At this stage the welding according to the invention is performed by means of an ultrasound welding method, wherein at this moment the two tools 1, 2 still do not contact each other. A gap exists between the processing tool 1 and the counter tool 2, which is predefined in dependence on the type of film and the thickness of the film. In the next step (see FIG. 6c) the processing tool 1 is moved further to the left by overcoming the spring force of the spring-loaded distance blocks. As a result of moving the two tools 1, 2 together the entering of an approximately triangular blade 12 with cutting tip 14 into the material of the films 6, the separation of the tubular bags is caused at the desired separation line.

Of course the shape of the processing tool 1 and the counter tool 2 can vary without departing from the scope of the invention as defined in the following claims. The device 10 can also be modified and can for example be constructed as a horizontally acting device. The minimal working gap between the processing tool 1 and the counter tool 2 during the ultrasound welding can also be maintained in different ways than using the spring-loaded distance blocks 3, for example by the guide of the device 10. The plastic films can be pure plastic films or films made of a material mixture. Thus films made of plastic with an aluminum component can also be welded and separated very well with the invention.

The invention claimed is:

1. A method of producing two-layered or multi-layered thin plastic films, comprising:
applying an ultrasound excitation to a processing tool arranged in confronting relationship with a surface of a counter tool, said processing tool comprising a cutting means fixedly arranged on the processing tool;

during the ultrasound excitation of the processing tool moving the counter tool toward the processing tool or the processing tool toward the counter tool into a first position of the counter tool relative to the processing tool in which the counter tool contacts spring-loaded distance blocks and in which a defined gap is maintained between the surface of the counter tool and the processing tool;

welding the plastic films by ultrasound welding at predetermined distances along a longitudinal direction of the plastic films, so as to generate welding seams extending substantially transverse to the longitudinal direction of the thin plastic films, thereby dividing the plastic films in the form of tubular bags for a portioned reception of various products, turning off the ultrasound excitation during a deflection of the counter tool on the spring-loaded distance blocks, wherein a substantially constant parallel distance between the processing tool and the counter tool is maintained;

mechanically separating the welded tubular bags at a site of the respective welding seams by contacting the respective welding seams with the cutting means, said contacting being performed by moving the counter tool toward the processing tool or the processing tool toward the counter tool against a spring force of the spring loaded distance blocks from the first position into a second position of the counter tool relative to the processing tool so as to reduce the gap between the surface of the counter tool and the processing tool, said mechanically separating being performed without or with decreased ultrasound excitation; and moving the processing tool and the counter tool to the starting position.

2. The Method of claim 1, wherein the processing tool is moved closer to the counter tool after the welding step.

3. The Method of claim 1, wherein in the mechanically separating step the processing tool and the counter tool are brought in direct contact with each other for separating the tubular bags.

4. The method of claim 1, further comprising controlling an ultrasound excitation of the processing tool as a function of a control of a machine drive.

5. The method of claim 1, wherein in the welding step a minimal film-dependent working gap is maintained between the processing tool and the counter tool during the ultrasound excitation.

* * * * *